(12) United States Patent
Saito et al.

(10) Patent No.: US 10,120,189 B2
(45) Date of Patent: Nov. 6, 2018

(54) HEADS-UP DISPLAY DEVICE

(71) Applicant: NIPPON SEIKI CO., LTD., Niigata (JP)

(72) Inventors: Maiko Saito, Niigata (JP); Yuichi Takahashi, Niigata (JP); Takuro Hirokawa, Niigata (JP); Takashi Yamazoe, Niigata (JP); Kazuo Morohashi, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 19 days.

(21) Appl. No.: 15/316,959

(22) PCT Filed: May 29, 2015

(86) PCT No.: PCT/JP2015/065494
§ 371 (c)(1),
(2) Date: Dec. 7, 2016

(87) PCT Pub. No.: WO2015/190311
PCT Pub. Date: Dec. 17, 2015

(65) Prior Publication Data
US 2017/0115485 A1 Apr. 27, 2017

(30) Foreign Application Priority Data

Jun. 9, 2014 (JP) .................................. 2014-118822
Feb. 26, 2015 (JP) .................................. 2015-036227

(51) Int. Cl.
*G02B 27/01* (2006.01)
*B60K 35/00* (2006.01)
(Continued)

(52) U.S. Cl.
CPC .......... *G02B 27/0149* (2013.01); *B60K 35/00* (2013.01); *G02B 27/0101* (2013.01);
(Continued)

(58) Field of Classification Search
CPC ............ B60K 35/00; B60K 2350/2026; B60K 2350/2052; B60K 2350/2056;
(Continued)

(56) References Cited

U.S. PATENT DOCUMENTS

2010/0073579 A1 3/2010 Okada et al.
2012/0236046 A1 9/2012 Sugiyama et al.

FOREIGN PATENT DOCUMENTS

EP 2412557 A1 2/2012
JP 7-329603 A 12/1995
(Continued)

OTHER PUBLICATIONS

International Search Report issued in PCT/JP2015/065494 dated Aug. 18, 2015, with English translation.

*Primary Examiner* — Stacy Khoo
(74) *Attorney, Agent, or Firm* — McDermott Will & Emery LLP

(57) ABSTRACT

The objective of the present invention is to provide a heads-up display device able to efficiently orient image light towards a viewer by means of a simple configuration. The heads-up display device is provided with: a projection unit that emits projection light depicting a display image; a first reflection unit and second reflection unit that reflect the projection light exiting the projection unit towards a transmissive screen; and the transmissive screen that outputs image light towards an observer by transmitting/scattering the projection light. By adjusting the angle of the light axis of the projection light entering the transmissive screen by rotating the first reflection unit and second reflection unit, the angle of the image light exiting the transmissive screen is adjusted.

10 Claims, 7 Drawing Sheets

(51) Int. Cl.
 *G03B 21/14* (2006.01)
 *G03B 21/28* (2006.01)
 *G06F 3/01* (2006.01)
 *G09G 3/00* (2006.01)
 *G09G 3/02* (2006.01)

(52) U.S. Cl.
 CPC ........... *G03B 21/142* (2013.01); *G03B 21/28* (2013.01); *G06F 3/013* (2013.01); *G09G 3/002* (2013.01); *G09G 3/02* (2013.01); *B60K 2350/2026* (2013.01); *B60K 2350/2052* (2013.01); *B60K 2350/2056* (2013.01); *B60K 2350/352* (2013.01); *G02B 2027/0127* (2013.01); *G02B 2027/0145* (2013.01); *G02B 2027/0159* (2013.01)

(58) Field of Classification Search
 CPC .......... B60K 2350/352; G02B 27/0101; G02B 27/0149; G02B 2027/0127; G02B 2027/0145; G02B 2027/0159; G03B 21/142; G03B 21/28; G06F 3/013; G09G 3/002; G09G 3/02
 See application file for complete search history.

(56) References Cited

FOREIGN PATENT DOCUMENTS

| | | |
|---|---|---|
| JP | 2009-246505 A | 10/2009 |
| JP | 2010-078860 A | 4/2010 |
| JP | 2010-221830 A | 10/2010 |
| JP | 2013-130832 A | 7/2013 |
| JP | 2014-021392 A | 2/2014 |
| JP | 2014-059431 A | 4/2014 |
| WO | 2012/042744 A1 | 4/2012 |

[Fig.1]
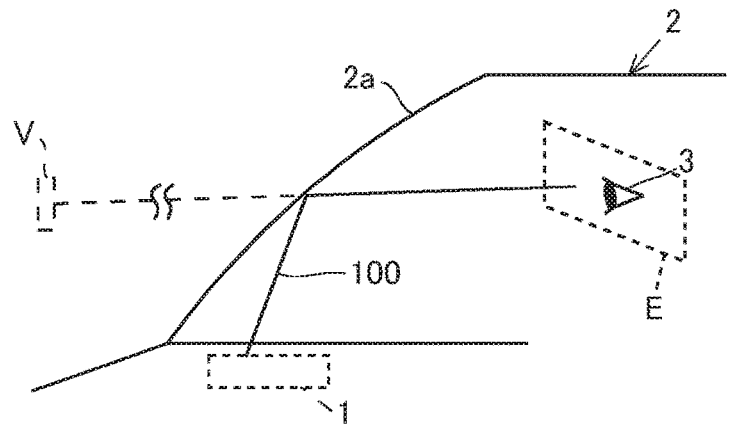
[Fig.2]
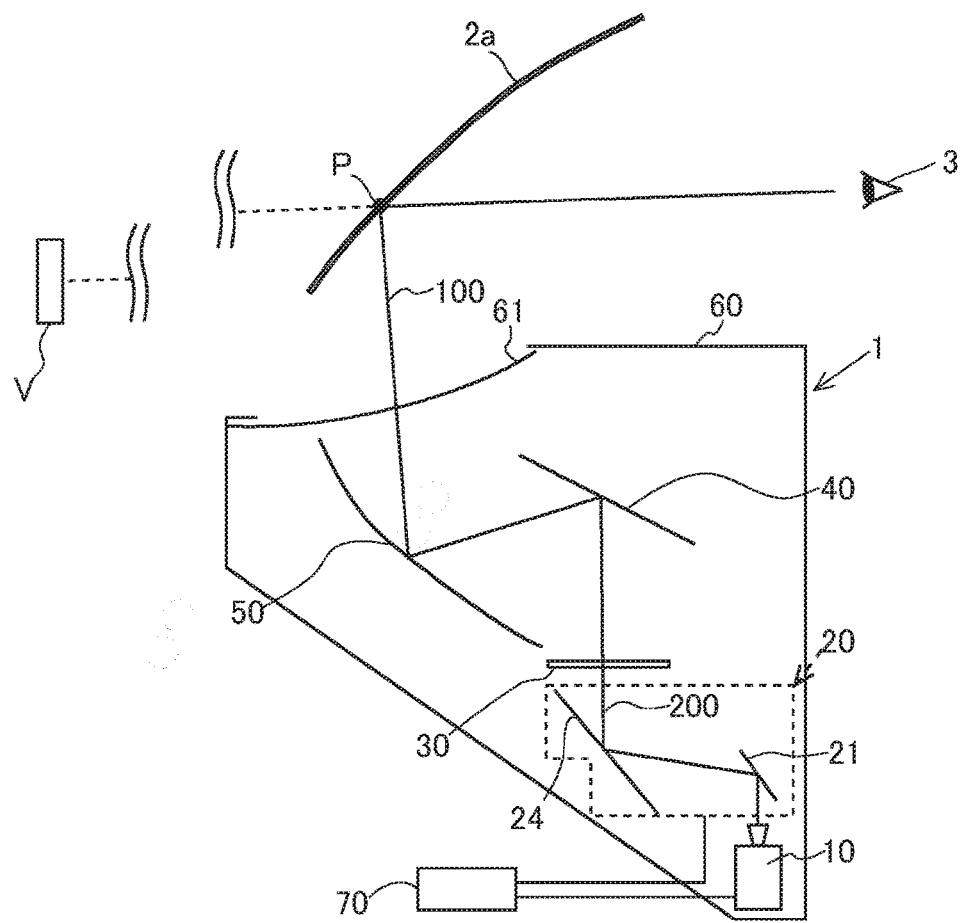

[Fig.3]
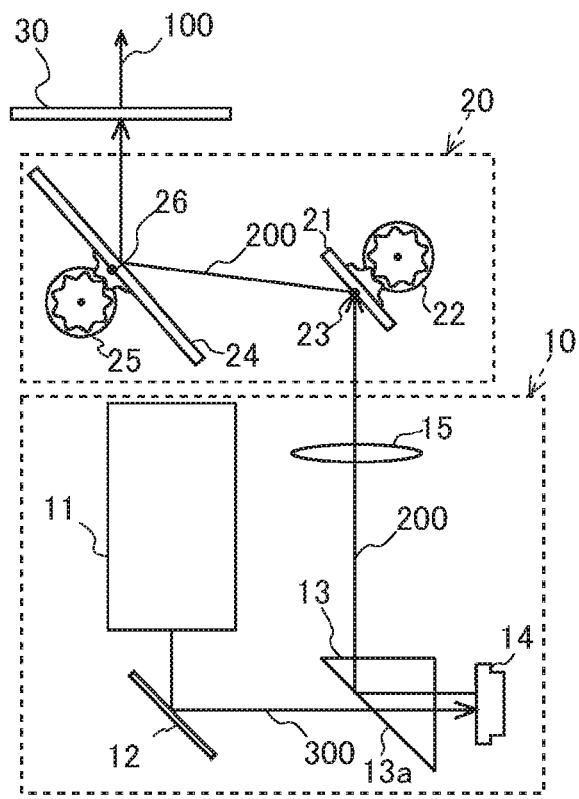
[Fig.4]
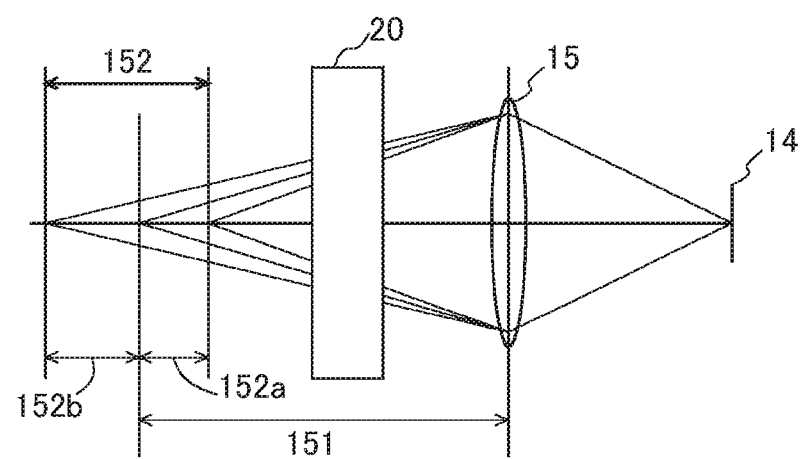

[Fig.5]
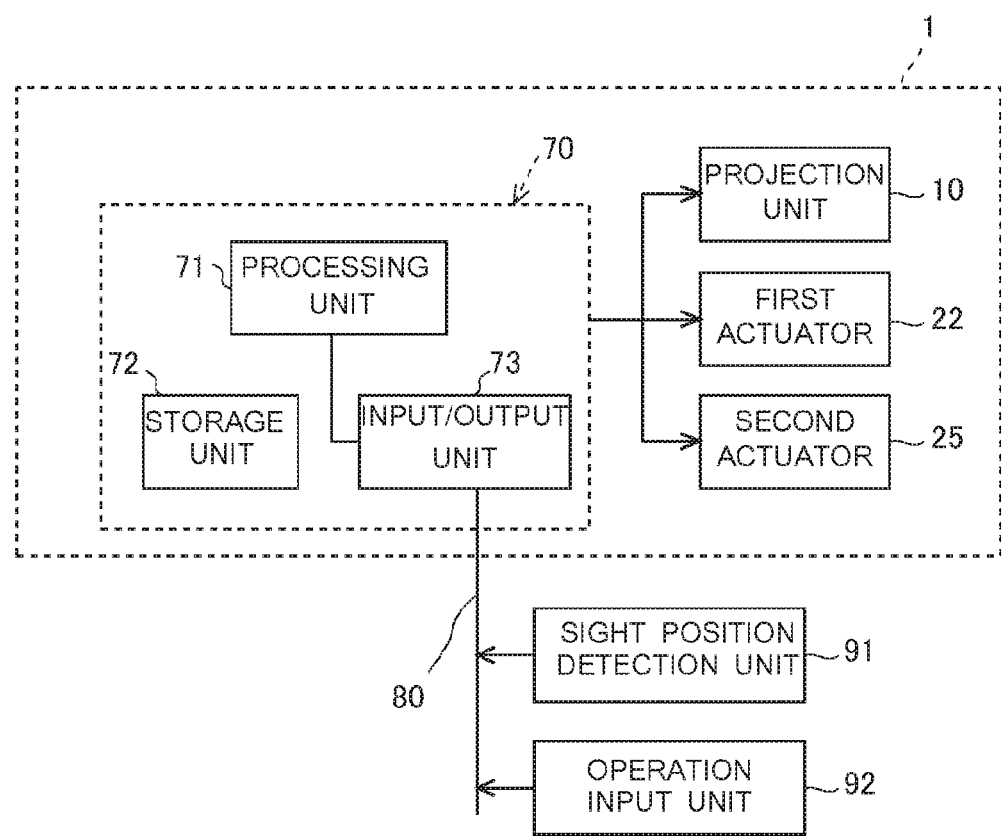

[Fig.6]
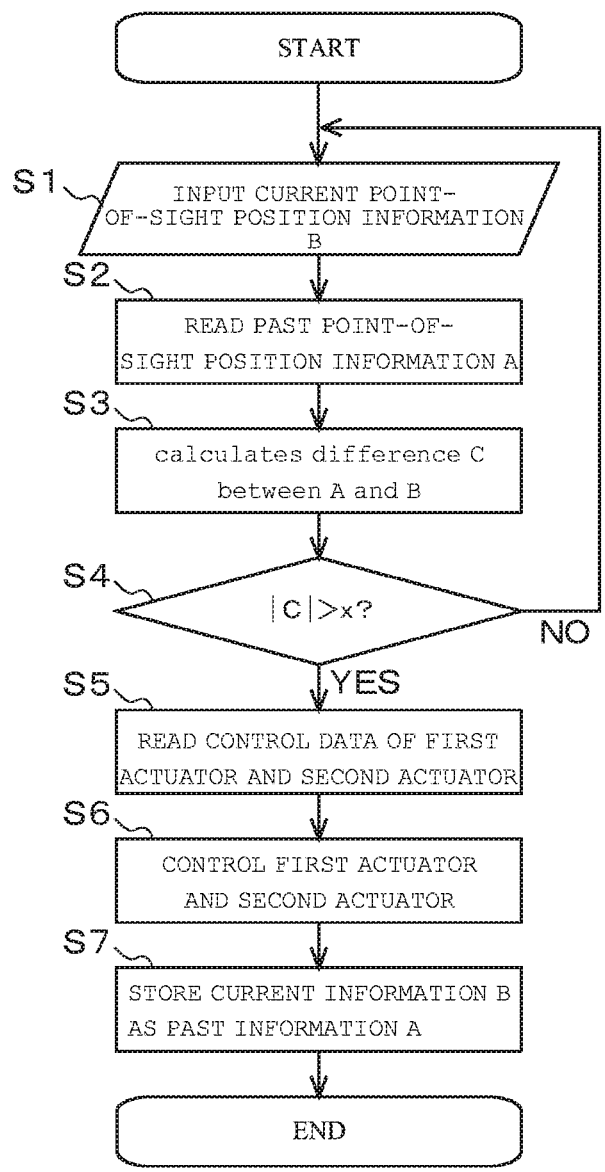

[Fig.7A]
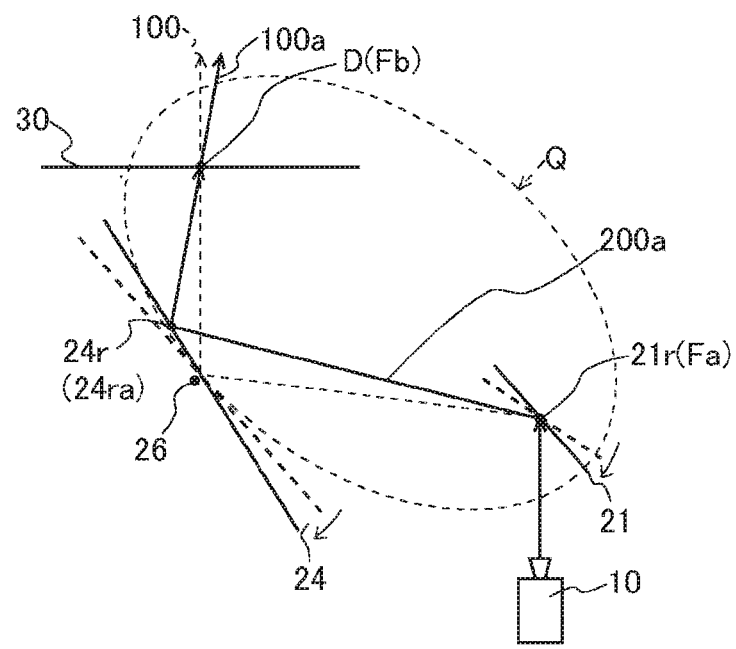
[Fig.7B]
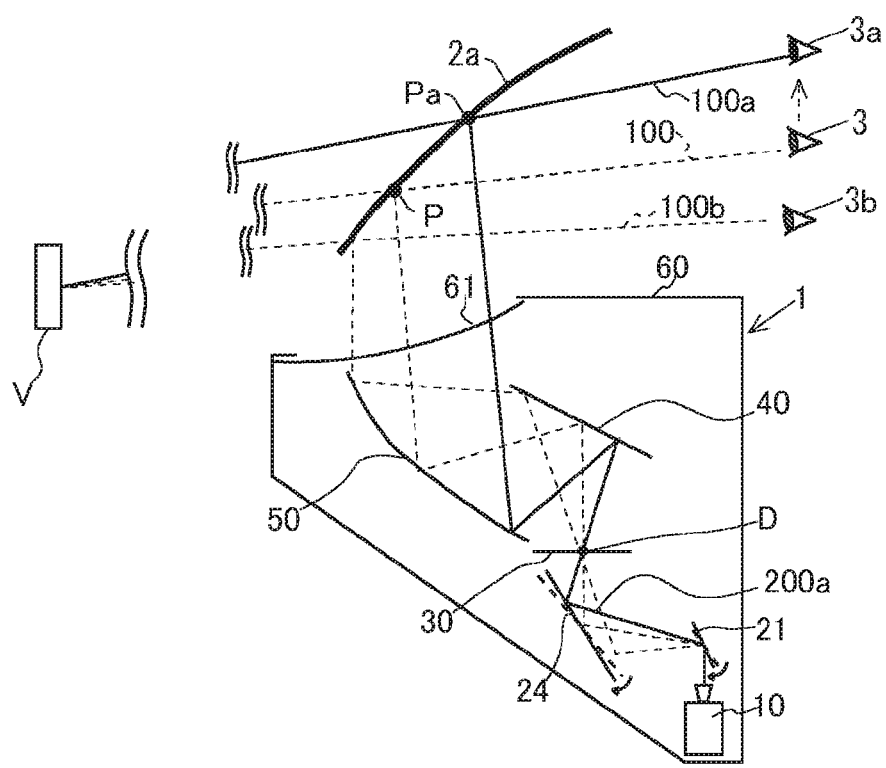

[Fig.8A]
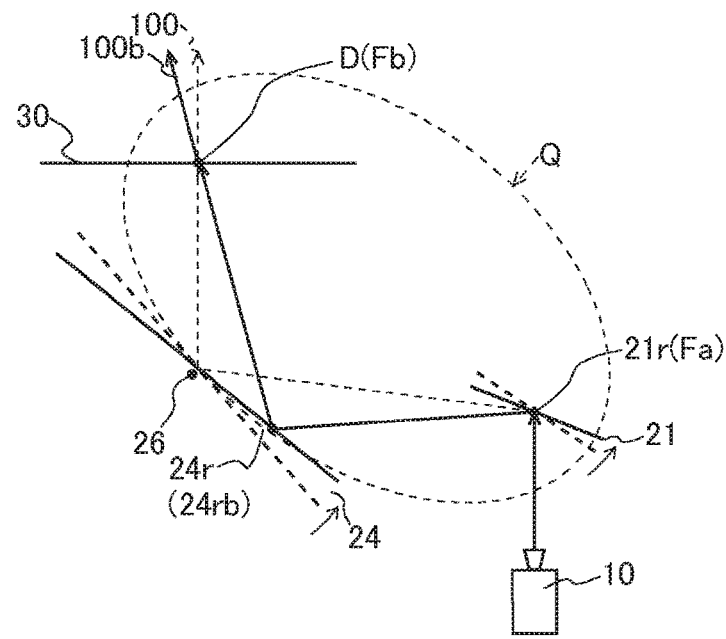
[Fig.8B]
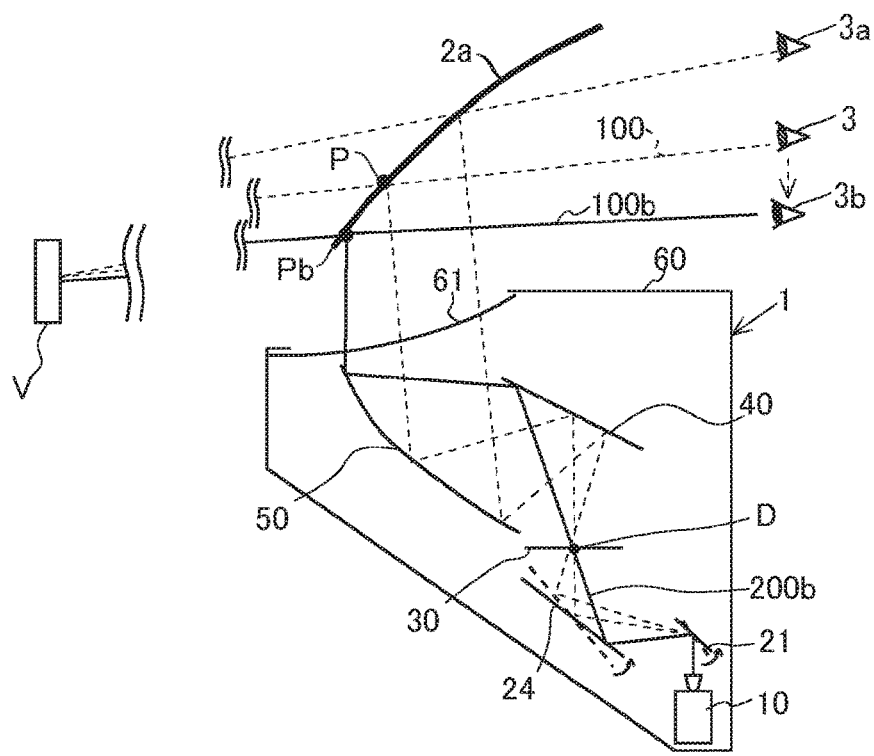

[Fig.9]
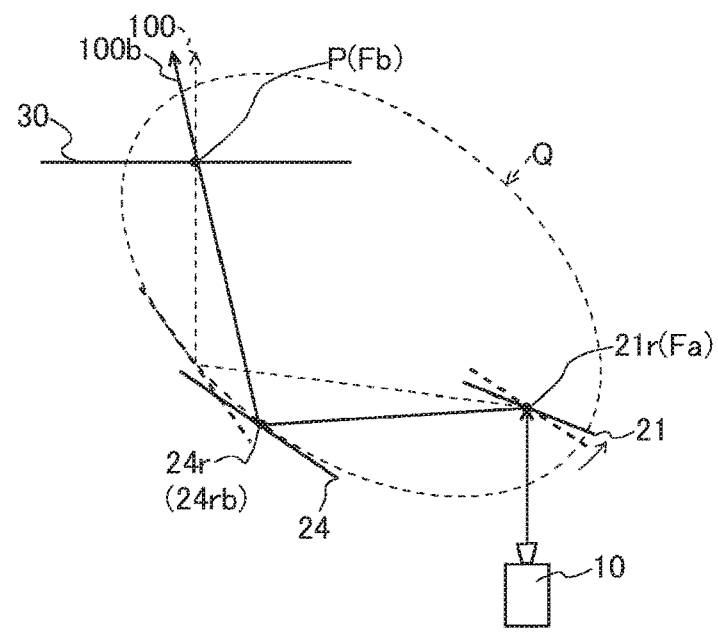
[Fig.10]
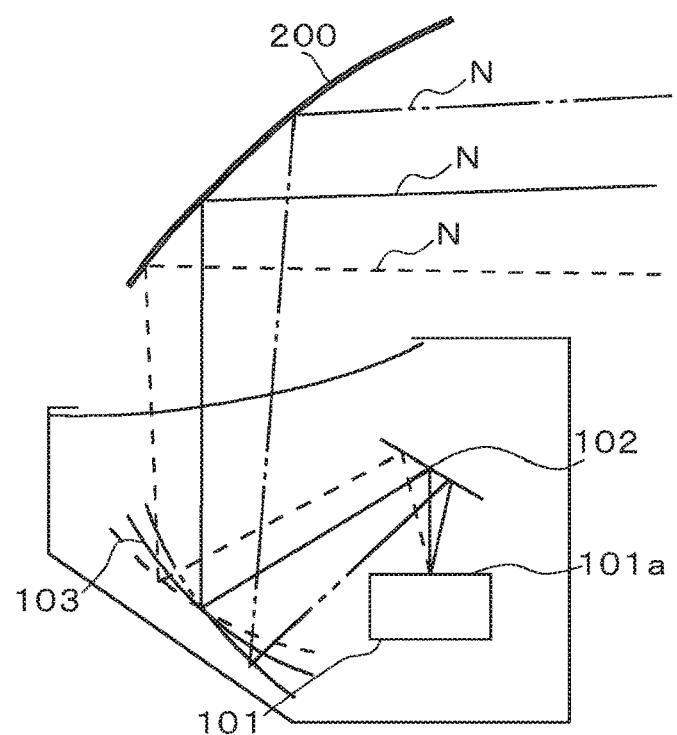

HEADS-UP DISPLAY DEVICE

CROSS REFERENCE

This application is the U.S. National Phase under 35 U.S.C. § 371 of International Application No. PCT/JP2015/065494, filed on May 29, 2015, which claims the benefit of Japanese Patent Application No. 2014-118822, filed on Jun. 9, 2014 and Japanese Patent Application No. 2015-036227, filed on Feb. 26, 2015, the entire contents of each are hereby incorporated by reference.

TECHNICAL FIELD

The present invention relates to a heads-up display device for causing an image superposed on a real view to be visually recognized.

BACKGROUND ART

A heads-up display device displays a virtual image while superposing the virtual image on a real view in front of own vehicle, thereby generating augmented reality (AR) in which information and the like are added to a real view, and accurately provides desired information to a viewer who drives the vehicle while reducing a move of the viewer's line of sight as much as possible, which contributes to safe and comfortable driving of a vehicle.

As a device for causing a viewer to visually recognize a virtual image, for example, PTL 1 discloses an image display device that includes a projection unit for projecting a luminous flux onto a predetermined projected position to cause a viewer to visually recognize a virtual image and detects the viewer's point-of-sight position to rotate a movable mirror on the basis of the detected point-of-sight position, thereby orienting the luminous flux emitted by the projection unit toward the viewer's point-of-sight position.

For example, PTL 2 discloses a display device that adjusts an angle by moving a display and a reflection unit along a circular arc, thereby orienting image light emitted from the display toward a viewer's point-of-sight position, which causes the viewer to visually recognize the image light from the display efficiently.

CITATION LIST

Patent Literatures

PTL 1: JP-A-2009-246505
PTL 2: JP-A-7-329603

SUMMARY OF INVENTION

Technical Problem(s)

In the case where the movable mirror is rotated in accordance with a viewer's point-of-sight position to adjust a projected position of a luminous flux as in PTL 1, as illustrated in, for example, FIG. 10, a display 101 for emitting image light N, a reflection unit 102 for reflecting the image light N from the display 101, and a concave reflection unit (movable mirror) 103 for reflecting the image light N reflected by the reflection unit 102 toward a transmissive reflective surface 200 are included, and a position onto which the image light N is projected is adjusted by rotating the concave reflection unit 103.

When referring to FIG. 10, beams of the image light N oriented toward respective viewers who are different in height of a point of sight are beams of light emitted from a display surface 101a of the display 101 in different directions. In order to prevent a change in brightness of a virtual image to be visually recognized even in the case where viewers are different in height of a point of sight, a light distribution characteristic of the image light N emitted by the display 101 needs to be constant in a wide range. Therefore, it is necessary to increase a light distribution angle (diffusion angle) (reduce directivity) of the image light N emitted from the display 101, and thus efficiency of the display 101 is reduced.

Further, as disclosed in PTL 2, in order to move the display which is an electronic device along a circular arc to orient image light toward a viewer's point-of-sight position, it is necessary to provide a complicated and large-scaled moving mechanism and the like.

The invention has been made in view of the above circumstances, and an object of the invention is to provide a heads-up display device capable of efficiently orienting image light toward a viewer with a simple configuration.

Solution to Problem(s)

In order to achieve the above object, a heads-up display device according to the invention, which is for projecting image light onto a transmissive reflective surface to cause a virtual image based on the image light to be visually recognized together with a real view through the transmissive reflective surface, includes: a projection unit for emitting projection light forming a display image; a transmissive screen for orienting the image light obtained by transmitting and diffusing the projection light toward the transmissive reflective surface; and an optical axis adjustment unit for adjusting an angle of an optical axis of the projection light incident on the transmissive screen, the optical axis adjustment unit being arranged between the projection unit and the transmissive screen and including a first reflection unit for reflecting the projection light emitted by the projection unit, a second reflection unit for reflecting the projection light reflected by the first reflection unit, and actuators for rotating the first reflection unit and the second reflection unit.

Advantageous Effects of Invention

According to a heads-up display device of the invention, it is possible to efficiently orient image light toward a viewer with a simple configuration.

BRIEF DESCRIPTION OF DRAWINGS

FIG. 1 is a schematic diagram in which a heads-up display device in an embodiment of the invention is mounted on a vehicle.

FIG. 2 is a schematic cross-sectional view of the HUD device in the same embodiment.

FIG. 3 is an explanatory view of a configuration of a projection unit and an optical axis adjustment unit in the same embodiment.

FIG. 4 is an explanatory view of a projected image distance of a projector lens in the same embodiment.

FIG. 5 is a block diagram showing an electric configuration of the HUD device in the same embodiment.

FIG. 6 is a flowchart showing optical axis adjustment processing in the same embodiment.

FIG. 7A illustrates a state of the optical axis adjustment unit occurring when the HUD device in the same embodiment orients image light toward a comparatively high point-of-sight position.

FIG. 7B illustrates a state of the whole HUD device occurring when the image light is oriented toward the comparatively high point-of-sight position shown in FIG. 7A.

FIG. 8A illustrates a state of the optical axis adjustment unit occurring when the HUD device in the same embodiment orients image light toward a comparatively low point-of-sight position.

FIG. 8B illustrates a state of the whole HUD device occurring when the image light is oriented toward the comparatively low point-of-sight position shown in FIG. 8A.

FIG. 9 illustrates a state of an optical axis adjustment unit occurring when an HUD device in a modification example orients image light toward a comparatively low point-of-sight position.

FIG. 10 is an explanatory view of a conventional heads-up display device.

DESCRIPTION OF EMBODIMENTS

An embodiment of the invention will be described below with reference to the drawings. Note that, although luminous fluxes of image light 100, projection light 200, illumination light 300, and the like described below innumerably exist in various directions, only an optical axis that is the center of each luminous flux is shown in order to easily understand the drawings.

FIG. 1 illustrates an overview of a heads-up display device (hereinafter, referred to as an HUD device) 1 according to this embodiment. As illustrated in FIG. 1, the HUD device 1 is typically provided in a dashboard of own vehicle 2, but a part or all of the HUD device 1 may be provided on the dashboard.

FIG. 2 is a schematic cross-sectional view illustrating a configuration of the HUD device 1.

As illustrated in FIG. 2, the HUD device 1 includes a projection unit 10, an optical axis adjustment unit 20, a transmissive screen 30, a folding mirror 40, a concave mirror 50, a housing 60 receiving the above members, and a control unit 70 for electrically control the HUD device 1. When image light 100 emitted by the HUD device 1 is projected onto a projected point P of a windshield (an example of a transmissive reflective surface) 2a and is reflected by the windshield 2a, a virtual image V is visually recognized at an arbitrary position in front of the windshield 2a (for example, 10 to 20 m in front thereof).

(Projection Unit 10)

FIG. 3 is an explanatory view of a specific configuration of the projection unit 10 and the optical axis adjustment unit 20 and an optical path of projection light 200.

The projection unit 10 in FIG. 3 includes a light source 11 for emitting illumination light 300, a light source mirror 12, a prism 13, a reflective display 14, and a projector lens 15 and emits the projection light 200 for forming a display image (not illustrated) on the transmissive screen 30 toward the optical axis adjustment unit 20. Note that the display image formed on the transmissive screen 30 may also be generally called a real image.

The light source 11 in FIG. 3 includes, for example, a plurality of LEDs capable of outputting light of red, blue, and green, respectively, and emits the illumination light 300 of a desired color with desired light intensity at a desired timing under the control of the control unit 70 described later. The projection unit 10 in this embodiment employs a field sequential color driving method, and the light source 11 of each color emits the illumination light 300 in time division.

The light source mirror 12 in FIG. 3 is obtained by, for example, forming a reflective film on a surface of a base made of a synthetic resin material by using depositing or other means and reflects the illumination light 300 from the light source 11 to cause the illumination light to be incident on the reflective display 14 at a proper angle.

The prism 13 in FIG. 3 is arranged between the light source mirror 12 and the reflective display 14 and has an inclined surface 13a that is inclined at a predetermined angle with respect to an optical axis of the illumination light 300 incident from the light source mirror 12. The illumination light 300 from the light source mirror 12, which has been incident on the inclined surface 13a, is transmitted through the inclined surface 13a and is incident on the reflective display 14, and then the projection light 200 emitted from the reflective display 14 is incident on the prism 13 again and is reflected by the inclined surface 13a in a direction toward the projector lens 15.

The reflective display 14 in FIG. 3 is, for example, a reflective display device such as a DMD (Digital Micromirror Device) or an LCoS (registered trademark: Liquid Crystal On Silicon) and converts the illumination light 300 incident from the prism 13 into the projection light 200 for displaying a virtual image V and reflects the projection light toward the prism 13 under the control of the control unit 70 described later.

The projector lens 15 in FIG. 3 is made up of, for example, a convex lens and enlarges the projection light 200 incident from the prism 13 to emit the projection light in a direction toward the optical axis adjustment unit 20. The projector lens 15 images the projection light 200 on the transmissive screen 30.

A projected image distance 151 of the projector lens 15 in FIG. 3 will be described with reference to FIG. 4. The projector lens 15 can generate the display image obtained by imaging the projection light 200 emitted from the reflective display 14 at a position apart from the projector lens 15 by a predetermined projected image distance 151 and can generate the display image that is substantially in focus by using the projection light 200 within a projected image plane depth 152 which is a predetermined range around the projected image distance 151. The optical axis adjustment unit 20 described later is arranged between the projector lens 15 and the transmissive screen 30 and changes an optical path length of the projection light 200 between the projector lens 15 and the optical axis adjustment unit 20 in the case where an angle of an optical axis of the projection light 200 incident on the transmissive screen 30 is adjusted. Hereinafter, the optical path length of the projection light 200 between the projector lens 15 and the optical axis adjustment unit 20 is also called a projection distance. When the optical axis adjustment unit 20 adjusts the angle of the optical axis of the projection light 200 within a range in which the projection distance of the projection light 200 falls within the projected image plane depth 152 of the projector lens 15, it is possible to generate the display image that is substantially in focus on the transmissive screen 30. Note that the projected image plane depth 152 has a front projected image plane depth 152a from the projected image distance 151 to the projector lens 15 side and a rear projected image plane depth 152b from the projected image distance 151 to the side opposite to the projector lens 15 side. Specifically, the projected image plane depth 152 has, for example, a range of about 3.319 mm in which the front projected image plane depth 152a has 1.641 mm and the rear projected image plane depth has 1.678 mm. Note that the projected image distance 151 and the projected image plane depth 152 may also be called a focal distance and a focal depth, respectively.

(Optical Axis Adjustment Unit 20)

The optical axis adjustment unit 20 in FIG. 3 receives the projection light 200 emitted by the projection unit 10 and adjusts the optical axis of the projection light 200 to project the projection light onto the transmissive screen 30. The optical axis adjustment unit 20 includes a first reflection unit 21 for allowing the projection light 200 from the projection unit 10 to be incident thereon and reflecting the projection light, a first actuator 22 for rotating the first reflection unit 21 around a first rotation axis 23, a second reflection unit 24 for allowing the projection light 200 reflected by the first reflection unit 21 to be incident thereon and reflecting the projection light toward the transmissive screen 30, and a second actuator 25 for rotating the second reflection unit 24 around a second rotation axis 26.

The first reflection unit 21 in FIG. 3 is, for example, a plane mirror and reflects the projection light 200 emitted by the projection unit 10 toward the second reflection unit 24. The first actuator 22 in FIG. 3 is made up of, for example, a stepping motor, and a gear is provided to a rotating shaft thereof. The first actuator 22 is placed in the housing 60, and the gear is engaged with a gear of the first reflection unit 21. Thus, an angle of inclination of the first reflection unit 21 is adjusted around the first rotation axis 23 in accordance with rotational drive of the first actuator 22, and therefore a reflection direction of the projection light 200 can be adjusted. Note that the first reflection unit 21 may have a concave, convex, or free-form surface shape.

The second reflection unit 24 in FIG. 3 is, for example, a plane mirror and reflects the projection light 200 reflected by the first reflection unit 21 toward the transmissive screen 30. The second actuator 25 in FIG. 3 is made up of, for example, a stepping motor, and a gear is provided to a rotating shaft thereof. The second actuator 25 is placed in the housing 60, and the gear is engaged with a gear of the second reflection unit 24. Thus, an angle of inclination of the second reflection unit 24 is adjusted around the second rotation axis 26 in accordance with rotational drive of the second actuator 25, and therefore the reflection direction of the projection light 200 can be adjusted. Note that the first rotation axis 23 serving as the center of rotation of the first reflection unit 21 and the second rotation axis 26 serving as the center of rotation of the second reflection unit 24 are positioned in parallel in the same direction. The optical axis adjustment unit 20 is placed so that the projection light 200 from the projection unit 10 is vertically incident on the first rotation axis 23 (second rotation axis 26). With this, even in the case where the first reflection unit 21 and the second reflection unit 24 are rotated by "optical axis adjustment processing" described later, an optical path of the projection light 200 reflected by the first reflection unit 21 between the projection unit 10 and the second reflection unit 24 and an optical path of the projection light 200 reflected by the second reflection unit 24 between the first reflection unit 21 and the transmissive screen 30 always pass on the same plane. That is, a change in the optical path of the projection light 200, which is caused by rotation of the first reflection unit 21 and the second reflection unit 24, can be simplified, and therefore it is possible to simplify arrangement and a mechanism of the optical axis adjustment unit 20. Note that the second reflection unit 24 may have a concave, convex, or free-form surface shape.

That is, the optical axis adjustment unit 20 in FIG. 3 can adjust an angle of incidence of the optical axis of the projection light 200 to be incident on the transmissive screen 30 by adjusting the angles of both the first reflection unit 21 and the second reflection unit 24 in conjunction with each other. The "optical axis adjustment processing" for adjusting the angle of the optical axis of the projection light 200, which is performed by the optical axis adjustment unit 20, will be described in detail below.

The transmissive screen 30 in FIG. 3 is made up of, for example, a holographic diffuser, a microlens array, or a diffusion plate and receives the projection light 200 from the optical axis adjustment unit 20 (second reflection unit 24) on a rear surface thereof and emits the transmitted and diffused image light 100 toward a light distribution area E in FIG. 1. The transmissive screen 30 orients light obtained by causing the projection light 200 to be incident thereon and diffusing the projection light toward the folding mirror 40. When a viewer's point-of-sight position is in the light distribution area E, the transmissive screen 30 orients the image light 100 so that the virtual image V to be visually recognized has a substantially uniform brightness. The HUD device 1 of the invention can adjust a direction of an optical axis of the image light 100 emitted from the transmissive screen 30 by using the optical axis adjustment unit 20. That is, the HUD device 1 of the invention can adjust a position of the light distribution area E to which the image light 100 is distributed, and therefore it is possible to efficiently orient the image light 100 (light distribution area E) toward a viewer's point-of-sight position.

The folding mirror (relay optical system) 40 in FIG. 2 is obtained by, for example, forming a reflective film on a surface of a base made of a synthetic resin material by using depositing or other means and reflects the projection light 200 diffused by transmitted through the transmissive screen 30 toward the concave mirror 50 described later.

The concave mirror (relay optical system) 50 in FIG. 2 is obtained by, for example, forming a reflective film on a surface of a base made of a synthetic resin material by using depositing or other means, and a curvature of the concave mirror 50 has a concave free-form surface. A detailed shape of the surface thereof is calculated by optical design software on the basis of a positional relationship with the transmissive screen 30, the folding mirror 40, the windshield 2a, and a moving range of a viewer's point of sight (eye box), a curvature of the windshield 2a, a required imaging distance of the virtual image V, and an angle of view of the HUD device 1 visually recognized by the viewer. The concave mirror 50 can be designed by the optical design software so that distortion of the virtual image V is minimized in a constraint condition in which a position of the virtual image V is not changed even in the case where the viewer's point-of-sight position is moved. The concave mirror 50 enlarges the projection light 200 reflected by the folding mirror 40 and reflects the enlarged projection light toward the windshield 2a. Note that a relay optical system that orients the image light 100 from the transmissive screen 30 toward the light distribution area E is not limited to a reflective relay optical system such as the folding mirror 40 and the concave mirror 50 and may be a refractive relay optical system such as a lens.

The housing 60 in FIG. 2 is a substantially box-shaped member made of a metal material such as aluminum, has various attaching shapes (not illustrated) thereinside, and holds the projection unit 10, the optical axis adjustment unit 20, the transmissive screen 30, and the folding mirror 40 in a predetermined positional relationship in this embodiment. An internal surface of the housing 60 is painted with, for example, black to make it difficult to generate stray light caused by the outside of the HUD device 1 and the projection unit 10. A light transmitting portion 61 made of, for example, a transparent resin material through which the image light 100 reflected by the concave mirror 50 is transmitted is provided on an upper surface of the housing 60.

An electric configuration of the HUD device 1 will be described with reference to FIG. 4. As illustrated in FIG. 4, the control unit 70 includes a processing unit 71 including one or a plurality of microprocessors, microcontrollers, ASICs, FPGAs, arbitrary other ICs, and the like, a storage unit 72 including one or a plurality of memories capable of storing programs and data, such as a ROM, an EEPROM, and a flash memory that is a nonvolatile memory, and an input/output unit 73 connected to a network unit 80 described later. Note that the control unit 70 is mounted on, for example, a printed circuit board (not illustrated) which is provided inside the housing 60 or is partially or completely provided outside the housing 60.

The network unit 80 is, for example, a CAN (Controller Area Network) and connects the control unit 70 (input/output unit 73) to a sight position detection unit 91, an operation input unit 92, and the like described later on a vehicle side so that signals can be transmitted/received therebetween.

The sight position detection unit 91 in FIG. 5 detects a viewer's point-of-sight position (at least upper and lower positions in a vertical direction of the point of sight) and, in this embodiment, includes an infrared camera (not illustrated) for capturing an image of a viewer and a point-of-sight image analysis unit (not illustrated) for analyzing data of the captured image acquired by this infrared camera.

The infrared camera captures an image of eyes of a viewer, and the point-of-sight image analysis unit performs image analysis on the data of the captured image acquired by the infrared camera with publicly-known image processing, a pattern matching method, or the like, thereby analyzing the viewer's point-of-sight position and outputting information on the viewer's point-of-sight position (point-of-sight position information B) to the control unit 70. Based on the point-of-sight position information B from the sight position detection unit 91, the control unit 70 drives the first actuator 22 and the second actuator 25 as described later, thereby rotating the first reflection unit 21 and the second reflection unit 24. Note that the viewer may operate the operation input unit 92 to adjust a direction of the image light 100 so that the direction is matched with the viewer's point-of-sight position. In such a case, the control unit 70 inputs operation information via the input/output unit 73 from the operation input unit 92 and drives the first actuator 22 and the second actuator 25 as described later on the basis of this operation information, thereby rotating the first reflection unit 21 and the second reflection unit 24.

The input/output unit 73 in FIG. 5 inputs the point-of-sight position information B from the sight position detection unit 91 and the operation information from the operation input unit 92 via the network unit 80. The processing unit 71 reads a program of the optical axis adjustment processing from the storage unit 72 and executes the program on the basis of the point-of-sight position information B or the operation information input via the input/output unit 73.

For example, the storage unit 72 stores in advance table data in which the point-of-sight position information B or the operation information and control data of the first actuator 22 and the second actuator 25 are associated with each other. The processing unit 71 reads the control data associated with the point-of-sight position information B or the operation information input via the input/output unit 73 by using the table data stored in the storage unit 72 and drives the first actuator 22 and the second actuator 25. Note that the first reflection unit 21 and the second reflection unit 24 rotate at a constant ratio of rotation, and therefore it is unnecessary to individually store the control data. This makes it possible to reduce a capacity of the storage unit 72. Note that the input/output unit 73 in this embodiment also has functions of point-of-sight position information acquiring means and operation information acquiring means recited in Claims.

When the processing unit 71 distorts an image generated by the reflective display 14 in advance and emits the image in the form of the projection light 200, it is possible to offset or reduce distortion of the image generated due to the angles of the first reflection unit 21 and the second reflection unit 24, the curvature of the concave mirror 50, the curvature of the windshield 2a (reflective transmissive surface), a viewer's point-of-sight position, and the like. The "optical axis adjustment processing" in this embodiment will be described with reference to FIGS. 6 to 8.

FIG. 6 is a flowchart of the optical axis adjustment processing in this embodiment.

In Step S1, the processing unit 71 inputs current point-of-sight position information B on a viewer's point-of-sight position (including at least a height) from the sight position detection unit 91 via the input/output unit 73. When the current point-of-sight position information B is input, the processing unit 71 proceeds to Step S2.

In Step S2, the processing unit 71 reads past (previous) point-of-sight position information A stored in the storage unit 72. In Step S3, the processing unit 71 calculates a difference C between the past point-of-sight position information A and the current point-of-sight position information B.

In Step S4, the processing unit 71 determines whether or not an absolute value of the difference C is larger than a threshold x determined in advance (|C|>x). In the case where the absolute value of the difference C is larger than the threshold x (|C|>x) in Step S4 (YES in Step S4), i.e., in the case where a change in the viewer's point-of-sight position (a change in a vertical direction) is larger than a predetermined value, the processing unit 71 proceeds to Step S5. On the contrary, in the case where the absolute value of the difference C is equal to or smaller than the threshold x (|C|≤x) in Step S4 (NO in Step S4), the processing unit 71 proceeds to Step S1 again.

In Step S5, the processing unit 71 reads, from the storage unit 72, control data (correction values) of the first actuator 22 and the second actuator 25 corresponding to the current point-of-sight position information B. Then, in Step S6, the control data is output to the first actuator 22 and the second actuator 25. Note that, for example, the control data of the first actuator 22 and the second actuator 25 is stored in the storage unit 72 as table data associated with the point-of-sight position information. The first actuator 22 is rotationally driven on the basis of the input control data to adjust the angle of inclination of the first reflection unit 21, and the second actuator 25 is rotationally driven on the basis of the input control data to adjust the angle of inclination of the second reflection unit 24.

In Step S7, the processing unit 71 stores the current point-of-sight position information B in a general-purpose memory as the past point-of-sight position information A and updates the past point-of-sight position information A.

The processing unit 71 repeatedly executes the above control until a power supply is turned off, and therefore the processing unit 71 can operate the first actuator 22 and the second actuator 25 in accordance with the viewer's newest point-of-sight position information B to adjust the angle of inclination of the first reflection unit 21 and the angle of inclination of the second reflection unit 24, thereby adjusting a projected position of the image light 100 in accordance with the height of the viewer's point-of-sight position.

FIG. 7A illustrates a state of the optical axis adjustment unit 20 occurring when image light 100a is oriented toward a point-of-sight position 3a that is comparatively higher than a point-of-sight position 3 serving as a reference position.

The processing unit 71 executes the above control method to control the first actuator 22 and the second actuator 25 in accordance with input of the newest point-of-sight position information B. The first actuator 22 is rotationally driven to rotate the first reflection unit 21 in a clockwise direction in FIG. 7A, thereby adjusting the angle of inclination of the first reflection unit 21 in a steeper direction. Therefore, a reflection direction of the projection light 200 received from the projection unit 10 is adjusted in a direction denoted by a reference sign 200a shown in FIG. 7A. Simultaneously, the second actuator 25 is rotationally driven to rotate the second reflection unit 24 in the clockwise direction in FIG. 7A, thereby adjusting the angle of inclination of the second reflection unit 24 in a steeper direction. Therefore, the projection light 200a received from the first reflection unit 21 is reflected to pass through a predetermined point D on the transmissive screen 30. The transmissive screen 30 receives the projection light 200a reflected by the second reflection unit 24 on the rear surface and emits the image light 100a corresponding to the projection light 200a.

FIG. 7B illustrates a state of the whole HUD device 1 occurring when the image light 100a is oriented toward the point-of-sight position 3a that is comparatively higher than the point-of-sight position 3 serving as the reference position as described above with reference to FIG. 7A. The image light 100a whose angle has been adjusted by the optical axis adjustment unit 20 in FIG. 7A is reflected toward the point-of-sight position 3a at a projected point Pa positioning above the projected point P of the image light 100 oriented toward the point-of-sight position 3 serving as the reference position as illustrated in FIG. 7B. The image light 100a oriented toward the viewer's point-of-sight position 3a passes through the predetermined point D on the transmissive screen 30 in the same way as the image light 100 and 100b oriented toward the point-of-sight positions 3 and 3b in FIG. 7B. Therefore, an imaging position of the virtual image V to be visually recognized at the comparatively higher point-of-sight position 3a is substantially matched with imaging positions of the virtual image V to be visually recognized at the standard point-of-sight position 3 and the comparatively lower point-of-sight position 3b. Further, the image light 100 emitted from the transmissive screen 30 can be efficiently oriented toward the comparatively higher point-of-sight position 3a by the optical axis adjustment processing of the optical axis adjustment unit 20.

FIG. 8A illustrates a state of the optical axis adjustment unit 20 occurring when image light 100b is oriented toward the point-of-sight position 3b that is lower than the point-of-sight position 3 serving as a reference position.

The processing unit 71 executes the above control method to control the first actuator 22 and the second actuator 25 in accordance with input of the newest point-of-sight position information B. The first actuator 22 is rotationally driven to rotate the first reflection unit 21 in a counterclockwise direction in FIG. 8A, thereby adjusting the angle of inclination of the first reflection unit 21 in a gentler direction. Therefore, the reflection direction of the projection light 200 received from the projection unit 10 is adjusted in a direction denoted by a reference sign 200b illustrated in FIG. 8A. Simultaneously, the second actuator 25 is rotationally driven to rotate the second reflection unit 24 in the counterclockwise direction in FIG. 8A, thereby adjusting the angle of inclination of the second reflection unit 24 in a gentler direction. Therefore, the projection light 200b received from the first reflection unit 21 is reflected to pass through the predetermined point D on the transmissive screen 30. The transmissive screen 30 receives the projection light 200b reflected by the second reflection unit 24 on the rear surface and emits the image light 100b corresponding to the projection light 200b.

FIG. 8B illustrates a state of the whole HUD device 1 occurring when the image light 100b is oriented toward the point-of-sight position 3b that is comparatively lower than the point-of-sight position 3 serving as the reference position as described above with reference to FIG. 8A. The image light 100b whose angle has been adjusted by the optical axis adjustment unit 20 in FIG. 8A is reflected toward the point-of-sight position 3b at a projected point Pb positioning below the projected point P of the image light 100 oriented toward the point-of-sight position 3 serving as the reference position as illustrated in FIG. 8B. The image light 100b oriented toward the viewer's point-of-sight position 3b passes through the predetermined point D on the transmissive screen 30 in the same way as the image light 100 and 100a oriented toward the point-of-sight positions 3 and 3a in FIG. 8B. Therefore, the imaging position of the virtual image V to be visually recognized at the comparatively lower point-of-sight position 3b is substantially matched with the imaging positions of the virtual image V to be visually recognized at the standard point-of-sight position 3 and the comparatively higher point-of-sight position 3a. Further, the image light 100 emitted from the transmissive screen 30 can be efficiently oriented toward the comparatively lower point-of-sight position 3b by the optical axis adjustment processing of the optical axis adjustment unit 20.

For example, as illustrated in FIG. 7A and FIG. 8A, the first reflection unit 21 and the transmissive screen 30 are arranged at or near positions of focal points Fa and Fb, respectively, in a predetermined ellipse Q. Specifically, for example, a center point 21r of a reflection surface of the first reflection unit 21 is positioned at one focal point Fa in the ellipse Q, and a center point of the transmissive screen 30 is positioned at the other focal point Fb. The second reflection unit 24 reflects the projection light 200 reflected by the first reflection unit 21 toward the predetermined point D on the transmissive screen 30 at a reflection position 24r (24ra, 24rb) near a locus of the ellipse Q indicated by a dotted line in FIG. 7A and FIG. 8A.

Because of a property of the ellipse, a sum total of a distance between the one focal point Fa and the reflection position 24r and a distance between the reflection position 24r and the other focal point Fb is the same as long as the reflection position 24r is on the locus of the ellipse Q, irrespective of a position of the reflection position 24r. In other words, when the light (projection light 200) from the one focal point Fa (first reflection unit 21) is reflected on the locus of the ellipse Q toward the other focal point Fb (transmissive screen 30), an optical path length of the light (projection light 200) between the one focal point Fa (first reflection unit 21) and the other focal point Fb (transmissive screen 30) can always be the same. However, the second reflection unit 24 rotates around the second rotation axis 26 in this embodiment, and therefore, in the case where the reflection point 24r is positioned on the locus of the ellipse Q, the projection light 200 reflected by the second reflection unit 24 does not pass through the predetermined point D on the transmissive screen 30. That is, in the case where the angle of the second reflection unit 24 is adjusted so that the reflection point 24r of the second reflection unit 24 is positioned on the locus of the predetermined ellipse Q, a position of the display image to be formed on the transmissive screen 30 is shifted. In the case where the display image to be formed on the transmissive screen 30 is shifted due to optical axis adjustment of the optical axis adjustment unit 20, it is necessary to increase a size of the transmissive screen 30 in advance so that the display image to be formed is not outside the transmissive screen 30.

In the second reflection unit 24 in this embodiment, a position that is not on the locus of the ellipse Q is set to be the reflection position 24r (24ra, 24rb) so that the projection light 200 reflected by the first reflection unit 21 is reflected toward the predetermined point D on the transmissive screen 30. Thus, a shift of the display image to be formed on the transmissive screen 30, which is caused by adjustment of the angle of the second reflection unit 24, is suppressed, and therefore the size of the transmissive screen 30 can be reduced. Note that, because the reflection point 24r of the second reflection unit 24 is not positioned on the locus of the ellipse Q in this embodiment, the optical path length of the projection light 200 between the first reflection unit 21 and the transmissive screen 30 is not always the same due to the optical axis adjustment processing. However, the projection distance that changes due to the optical axis adjustment processing falls within a range of the projected image plane depth of the projector lens 15, and therefore it is possible to generate the display image that can be considered to be in focus on the transmissive screen 30.

The HUD device 1 described above causes a viewer to visually recognize the virtual image V and includes the projection unit 10 for emitting the projection light 200, the first reflection unit 21 for reflecting the projection light 200 emitted by the projection unit 10, the first actuator 22 for rotating the first reflection unit 21, the second reflection unit 24 for reflecting the projection light 200 reflected by the first reflection unit 21, the second actuator 25 for rotating the second reflection unit 24, the control unit 70 for controlling the first actuator 22 and the second actuator 25, the transmissive screen 30 for allowing the projection light 200 reflected by the second reflection unit 24 to be transmitted therethrough and diffusing the projection light 200, and the concave mirror 50 for reflecting the image light 100 emitted from the transmissive screen 30 toward the windshield 2a (transmissive reflective surface), the concave mirror 50 having a concave curved surface for suppressing a shift of a position at which the virtual image V is visually recognized with respect to a real view even in the case where a height of the viewer's point of sight is changed within a predetermined range, and the control unit 70 drives the first actuator 22 and the second actuator 25 to adjust the angle of the optical axis of the projection light 200 incident on the transmissive screen 30. Therefore, it is possible to orient the direction of the image light 100 emitted from the transmissive screen 30 toward the viewer's point-of-sight position with a simple method of rotating the first reflection unit 21 and the second reflection unit 24.

The optical axis adjustment unit 20 adjusts the angle of the projection light 200 to be incident on the transmissive screen 30 within a predetermined angle range in order to orient the image light 100 toward a range of the height of the point of sight (point-of-sight positions 3a to 3b) which is normally used and causes the projection distance of the projection light 200 adjusted within this angle range between the projection unit 10 and the transmissive screen 30 to fall within the projected image plane depth of the projector lens 15. Therefore, even in the case where the optical axis adjustment processing is performed, it is possible to form the display image that can be considered to be in focus on the transmissive screen 30.

The optical axis adjustment unit 20 can adjust the projection light 200 to at least the first projection light 200 along a first optical axis, the second projection light 200a along a second optical axis, and the third projection light 200b along a third optical axis, whose angles incident on the transmissive screen 30 are different from one another, and orients the first, second, and third image light 200, 200a, and 200b toward the predetermined point D on the transmissive screen 30. Thus, even in the case where the optical axis adjustment processing is performed, the display image is formed in substantially the same region on the transmissive screen 30, and therefore it is possible to reduce the size of the transmissive screen 30. Further, the image light 200 (200a, 200b) which has been subjected to the optical axis adjustment processing passes through the predetermined point D, and therefore a viewer having a different point-of-sight position can also visually recognize the virtual image V at the same position with respect to a real view. Note that the predetermined point D is positioned on the transmissive screen 30 in the above embodiment but may not be positioned on the transmissive screen 30. Specifically, the position of the transmissive screen 30 may be shifted to the folding mirror 40 side or the projection unit 10 side from the position shown in FIG. 7B.

The concave mirror 50 has the concave curved surface for suppressing a shift of a position at which the virtual image V is visually recognized with respect to a real view even in the case where a height of a viewer's point of sight is changed within a predetermined range, and therefore the virtual image V having a fixed brightness, whose relative position visually recognized with respect to the real view is not changed even in the case where the viewer's point-of-sight position (height) is changed, can be visually recognized with a simple configuration in which the first reflection unit 21 and the second reflection unit 24 are rotated in the housing 60.

Although the second reflection unit 24 only rotates around the second rotation axis 26 in the above embodiment, the second reflection unit 24 may rotate while moving as illustrated in FIG. 9. With this configuration, it is possible to orient the projection light 200 incident from the first reflection unit 21 toward the predetermined point D while keeping the same optical path length between the projection unit 10 and the transmissive screen 30.

Although the first reflection unit 21 and the second reflection unit 24 are individually rotated by the respective actuators in the above embodiment, the first reflection unit 21 and the second reflection unit 24 may be rotated by a common actuator (not illustrated). Note that, by changing a gear ratio of gears that transmit power from the common actuator to the first reflection unit 21 and the second reflection unit 24, the first reflection unit 21 and the second reflection unit 24 are rotated at a predetermined ratio of rotation in accordance with drive of the common actuator.

In the case where the projected position of the projection light 200 is changed on the windshield 2a that is a curved surface, distortion of the virtual image V is changed depending on the projected position in some cases. In response to this, the control unit 70 may change a correction parameter for correcting the distortion of the virtual image V in accordance with an operation state of the first actuator 22 and/or the second actuator 25, i.e., an angle of incidence of the projection light 200 on the transmissive screen 30. This correction parameter is a parameter for distorting the display image in advance in a direction opposite to a direction of distortion on the windshield 2a and displaying the display image in order to suppress the distortion of the virtual image V projected onto the windshield 2a. For example, a plurality of correction parameters are stored in the form of a data table in the storage unit 72 so as to be associated with control data of the first actuator 22 and/or the second actuator 25, and the processing unit 71 determines the correction parameter in accordance with the control data of the first actuator 22 and/or the second actuator 25 determined with the above control method and outputs the correction parameter to the projection unit 10. Thus, it is possible to suppress the distortion of the virtual image V even in the case where the projected position of the projection light 200 on the windshield 2a is adjusted.

The reflective transmissive surface onto which the projection light 200 is projected is not limited to the windshield 2a of the own vehicle 2. The reflective transmissive surface onto which the projection light 200 is projected may be, for example, a combiner member provided dedicatedly.

Note that the projection unit 10 may have, for example, a function of adjusting a position of the projector lens 15 to adjust the projected image distance 151.

In the above description, in order to easily understand the invention, description of publicly-known unimportant technical matters has been omitted as appropriate.

INDUSTRIAL APPLICABILITY

The invention is applicable as a heads-up display device to be mounted on a mobile body such as a vehicle.

REFERENCE SIGNS LIST

1 HUD device (heads-up display device)
2 own vehicle
2a windshield (transmissive reflective surface)
3 viewer
10 projection unit
11 light source
12 light source mirror
13 prism
14 reflective display
15 projector lens
20 optical axis adjustment unit
21 first reflection unit
22 first actuator
24 second reflection unit
25 second actuator
30 transmissive screen
40 folding mirror
50 concave mirror
60 housing
70 control unit
71 processing unit
72 storage unit
73 input/output unit (point-of-sight position information acquiring means, operation information acquiring means)
80 network unit
91 sight position detection unit
92 operation input unit
100 image light
200 projection light
300 illumination light

The invention claimed is:

1. A heads-up display device for projecting image light onto a transmissive reflective surface to cause a virtual image based on the image light to be visually recognized together with a real view through the transmissive reflective surface, comprising:
   a projection unit for emitting projection light forming a display image;
   a transmissive screen for orienting the image light obtained by transmitting and diffusing the projection light toward the transmissive reflective surface; and
   an optical axis adjustment unit for adjusting an angle of an optical axis of the projection light incident on the transmissive screen, the optical axis adjustment unit being arranged between the projection unit and the transmissive screen and including a first reflector for reflecting the projection light emitted by the projection unit, a second reflector for reflecting the projection light reflected by the first reflector, and an actuator for rotating the first reflector and the second reflector.

2. The heads-up display device according to claim 1, wherein:
   the projection unit includes a projector lens for imaging the projection light on the transmissive screen; and
   the optical axis adjustment unit causes a projected image distance of the projection light adjusted within a predetermined angle range between the projection unit and the transmissive screen to fall within a projected image plane depth of the projector lens.

3. The heads-up display device according to claim 1, wherein the optical axis adjustment unit can adjust the projection light to at least first projection light along a first optical axis, second projection light along a second optical axis, and third projection light along a third optical axis, whose angles incident on the transmissive screen are different from one another, and the first projection light, the second projection light, and the third projection light intersect at a predetermined point.

4. The heads-up display device according to claim 3, wherein the transmissive screen has a surface having the predetermined point.

5. The heads-up display device according to claim 1, wherein the actuator includes a common actuator for rotating the first reflector and the second reflector and rotate the first reflector and the second reflector at a predetermined ratio of rotation.

6. The heads-up display device according to claim 1, wherein
   the actuator rotates the second reflector while moving the second reflector on a locus of a predetermined ellipse; and
   the predetermined ellipse has a first focal point at which a part of the first reflector is disposed and a second focal point at which a part of the transmissive screen is disposed.

7. The heads-up display device according to claim 1, wherein an optical path of the projection light between the projection unit and the second reflector, the projection light being reflected by the first reflector, and an optical path of the projection light between the first reflector and the transmissive screen, the projection light being reflected by the second reflector, pass on the same plane.

8. The heads-up display device according to claim 1, wherein the projection unit changes the projection light so as to correct distortion of the virtual image in accordance with operation of the optical axis adjustment unit.

9. The heads-up display device according to claim 1, further comprising a detector detecting point-of-sight position information on a viewer's point-of-sight position, wherein the actuator is driven on the basis of the point-of-sight position information input from the detector.

10. The heads-up display device according to claim 1, further comprising an interface receiving operation information from a viewer, wherein the actuator is driven on the basis of the operation information input from the interface.

* * * * *